Oct. 5, 1948.  G. E. HENNING  2,450,429
ELECTRICAL CORD
Filed Aug. 4, 1944  2 Sheets-Sheet 1
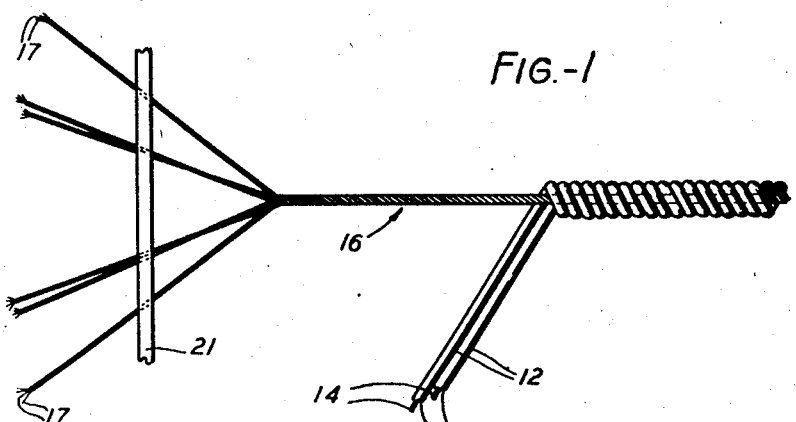
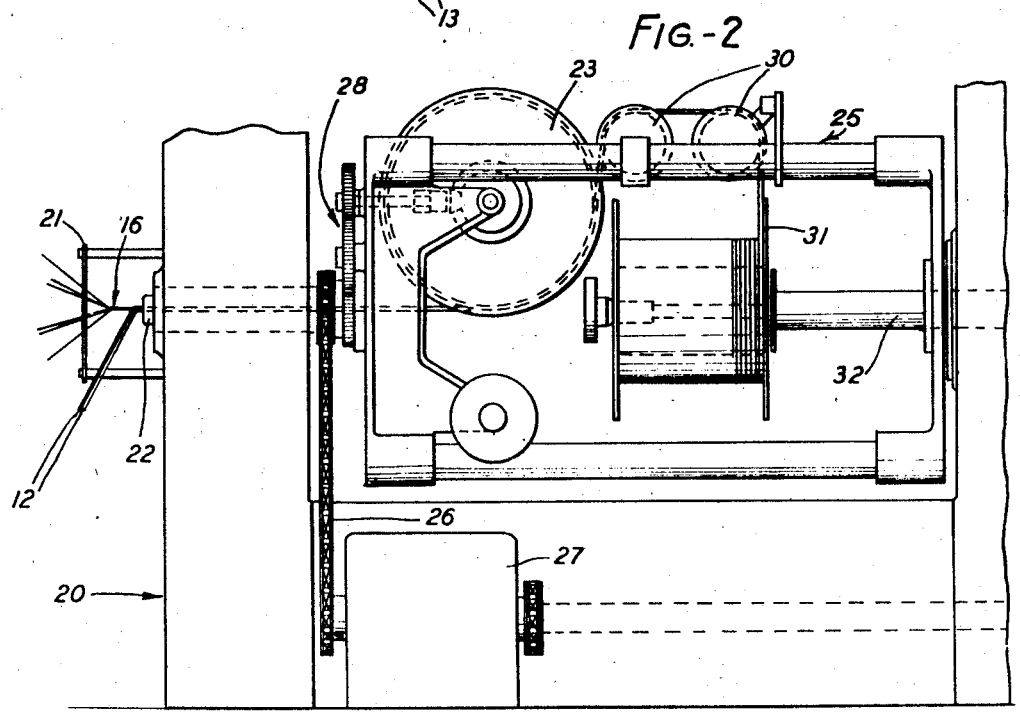
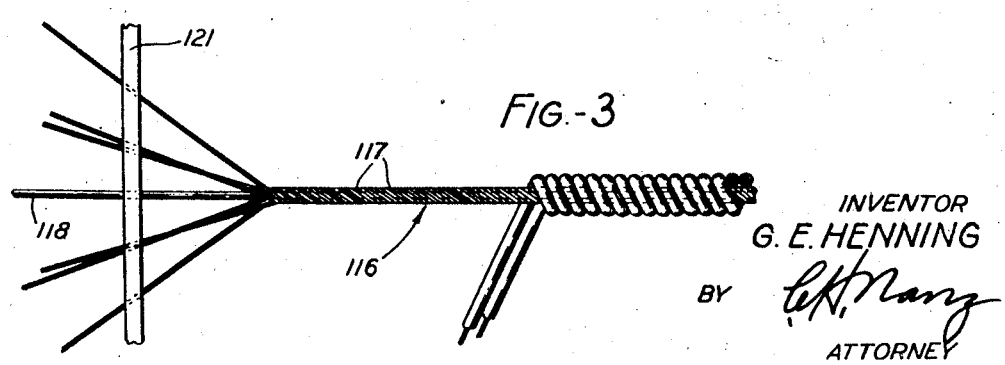
INVENTOR
G. E. HENNING
BY
ATTORNEY Oct. 5, 1948.  G. E. HENNING  2,450,429
ELECTRICAL CORD
Filed Aug. 4, 1944  2 Sheets-Sheet 2

INVENTOR.
G. E. HENNING
BY
ATTORNEY

Patented Oct. 5, 1948

2,450,429

UNITED STATES PATENT OFFICE 2,450,429

ELECTRICAL CORD

George E. Henning, Baltimore, Md., assignor to Western Electric Company, Incorporated, New York, N. Y., a corporation of New York Application August 4, 1944, Serial No. 548,099

7 Claims. (Cl. 174—113)

This invention relates to cords, and more particularly to close spiralled cordage.

Objects of the invention are to provide new and improved cords.

A cord constituting one embodiment of the invention comprises a plurality of small diameter textile threads twisted with a given lay to form a stay cord, and one or more insulated conductors served spirally around the stay cord with a lay substantially the same as that given to the threads.

A complete understanding of the invention may be obtained from the following detailed description thereof, when read in conjunction with the appended drawings, in which:

Fig. 1 is an enlarged, fragmentary side elevation of a portion of a cord embodying the invention as the portion of the cord is being formed;

Fig. 2 is a fragmentary side elevation of an apparatus for forming the portion of the cord shown in Fig. 1;

Fig. 3 is a fragmentary, side elevation of a portion of a cord forming an alternative embodiment of the invention as the portion of the cord is being formed;

Figure 4:
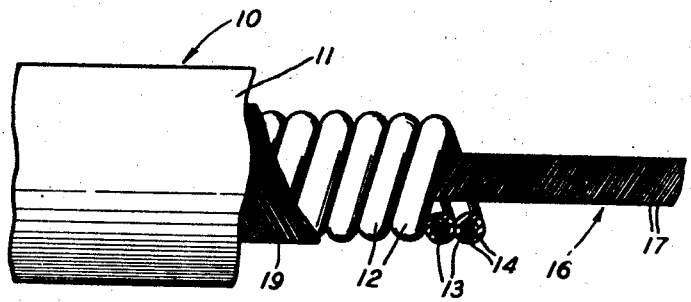
Fig. 4 is an enlarged, fragmentary, side elevation of the cord shown in Fig. 1.

Referring to the drawings, a cord 10 (Fig. 4), constituting one embodiment of the invention, includes a jacket 11 composed of a protective or insulating material surrounding a plurality of individually insulated conductors 12—12. Each of the insulated conductors 12—12 includes a cover 13 of an insulating material surrounding a conductor 14. The insulating material forming the covers 13—13 comprises a rubber or a rubber-like compound.

Each of the conductors 14—14 may consist of a single conductor, a plurality of fine wires stranded together, one or more tinsel conductors, or any other suitable type of conductor. The insulated conductors 12—12 are wrapped in close spirals around a stay cord 16, which consists of a plurality of fine cotton threads 17—17 which are stranded together. The lay and direction of the convolutions of the threads 17—17 are substantially the same as the lay and direction of the convolutions of the insulated conductors 12—12. The threads 17—17 forming the stay cord 16 are preferably fine and multitudinous. For example, an excellent stay cord has been made of 288 threads of No. 100-1 cotton cords. A spiral sheathing 19 of fine cotton threads is interposed between the conductors 12—12 and the jacket 11.

An apparatus suitable for constructing the cord 10 is a stranding machine 20 (Fig. 2), which is similar to that disclosed in Patent No. 2,338,848, issued on January 11, 1944. The stranding machine 20 includes a guide 21 for guiding the fine cotton threads 17—17 toward the interior of a hollow arbor 22 as the threads are drawn through the arbor by a capstan 23. The capstan 23 is rotatably mounted on a flyer 25 which is rotated by the arbor 22. A chain 26 driven by a driving mechanism 27 rotates the arbor 22 about the axis of the arbor and revolves the capstan 23 around that axis. A chain of gears 28 serves to rotate the capstan in a counterclockwise direction, as viewed in Fig. 2. The capstan is revolved about the axis of the arbor to strand the threads 17—17 to form the stay cord 16 and also serves to draw the insulated conductors 12—12 toward the right, as viewed in Fig. 2, and winds the conductors upon the stay cord 16 with the lay of the insulated conductors substantially the same as the lay of the threads 17—17, as the capstan is revolved by the flyer.

A pair of rollers 30—30 serve to guide the stranded insulated conductors and the stay cord from the capstan 23 to a take-up reel 31 around which the flyer is rotated, whereby the conductors and the stay cord are wound on the take-up reel. The take-up reel is mounted on a shaft 32 which is rotated and reciprocated by means disclosed in the patent mentioned hereinabove. The sheathing 19 and the jacket 11 are then formed over the conductors 12 and 13 by conventional apparatus.

Since the insulated conductors 12—12 are wrapped around the stay cord 16 in the same general direction and with substantially the same lay as the threads 17—17, the threads 17—17 lie substantially parallel to the insulated conductors and the threads conform themselves to the inner peripheries of the covers 13—13, thus forming a cushion for the conductors. Previously known stay cords included braided coverings formed over the outer peripheries thereof, and the threads forming such coverings were crossed over one another. Such crossovers tended to cut and damage the soft insulating covers formed over the conductors. Since the threads 17—17 are all substantially parallel with the covers 13—13, the threads do not cut the covers. The threads 17—17 and the insulated conductors 12—12 are formed in close spirals, as described hereinabove, to produce a highly flexible cord.

Figure 5:
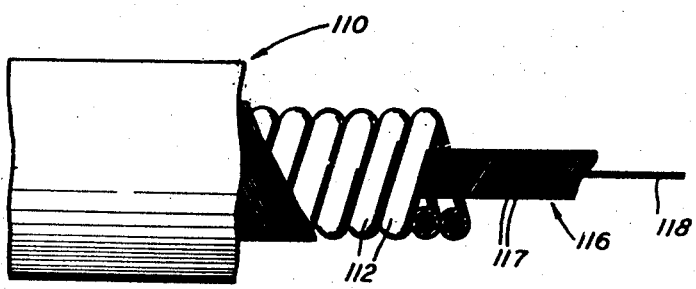
Fig. 5 is an enlarged, fragmentary, side elevation of the cord shown in Fig. 3.

A cord 110 (Fig. 5) is identical with the cord 10 except that a stay cord 116 forming part of the cord 110 includes a thread 118 of high tensile strength extending along the axis thereof. The textile thread 118 may be a thread of linen, rayon, nylon, steel, saran, fiber-glass or any other material whose tensile strength is high. The textile thread is surrounded by a multitude of fine cotton threads 117—117 identical with the threads 17—17 to form the stay cord. The cord 110 may be formed by a machine similar to the stranding machine 20 except that a guide 121 (Fig. 3) serves to guide the textile thread 118 along the axis of the arbor (not shown) of that machine as the threads 117—117 are wrapped therearound. The textile thread 118 serves to maintain the shape and body of the stay cord 116 and adds to the tensile strength of the cord 116, while it is surrounded by the threads 117—117, which serve to protect insulated conductors 112—112.

Figure 6:
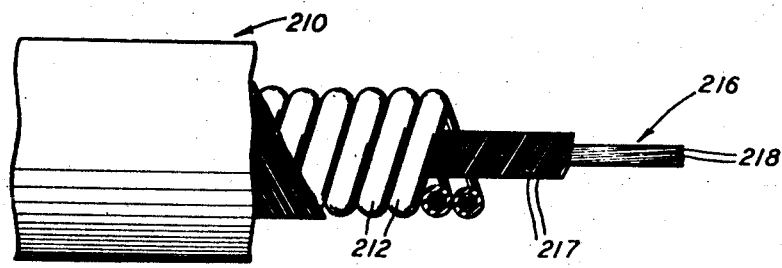
Fig. 6 is an enlarged, fragmentary, side elevation of a cord forming another embodiment of the invention.

A cord 210 (Fig. 6) constitutes a third embodiment of the invention. The cord 210 is identical with the cord 10 except that a stay cord 216 forming an element thereof consists of a plurality of fine cotton threads 218—218 extending axially thereof and a plurality of fine cotton threads 217—217, which are identical with the threads 17—17, stranded around the threads 218—218. The threads 218—218 serve to increase the tensile strength of the stay cord 216, while only the threads 217—217, which extend in the same general direction as a pair of insulated conductors 212—212, are in contact with the conductors. The proportion of the number of threads 217—217 to the number of threads 218—218 may be varied as desired, provided that the threads 217—217 are sufficient in number to form a cushion for the conductors 212—212. A stay cord having a high tensile strength has been produced with 192 of the threads 218—218 and 96 of the threads 217—217.

A stranding machine (not shown) similar to the stranding machine 20, may be used to form the cord 210. The stranding machine is provided with a guide similar to the guide 121 for guiding the threads 218—218 axially to the arbor of the machine.

Figure 7:
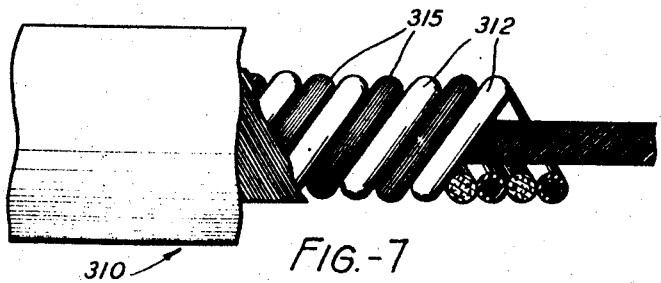
Fig. 7 is an enlarged, fragmentary, side elevation of a cord forming still another embodiment of the invention.

A cord 310 (Fig. 7), constituting still another embodiment of the invention, may be identical with any of the cords 10, 110 and 210, except that two filler strands 315—315 are disposed at the sides of a pair of conductors 312—312. The strands 315—315 are composed of fine textile threads which lie along the conductors 312—312 and are of substantially the same size as the conductors 312—312. The cord 310 is highly flexible, but has substantially less lengths of the conductors therein per unit of length of the cord than do the cords 10, 110 and 210. Consequently, substantial savings in materials and cost are achieved by making a cord of this construction, without losing flexibility and with ample conducting elements for satisfactory service.

In each of the cords 10, 110, 210 and 310 it is desirable that the respective cotton threads forming the outer portions of the stay cords should be parallel to the insulated conductors. However, due to practical limitations in the manufacture thereof, it may be necessary to gain only approximately parallel positions between the threads and the insulated conductors and the resultant cords are highly satisfactory since the threads are substantially parallel.

What is claimed is:

1. An electrical cord, which comprises a stay cord formed of textile threads with at least the outer threads thereof stranded together in a single direction and with a single predetermined lay, and an insulated conductor wrapped spirally around the threads in the same direction as and with substantially the same lay as the outer threads, whereby cutting of the insulated conductor by the outer threads of the stay cord is minimized.

2. An electrical cord, which comprises a stay cord including a central thread extending along the axis thereof and a plurality of textile threads wound around the central thread in a single direction with a predetermined lay, and an insulated conductor surrounding the stay cord and having a lay substantially equal to the lay of the threads and extending in the same direction as the threads so that the textile threads of the stay cord do not cut the insulated conductor.

3. An electrical cord, which comprises a stay cord including a plurality of textile threads extending parallel to the axis thereof, a plurality of fine textile threads surrounding the first-mentioned strands in a helical fashion with a single predetermined lay, and an insulated conductor positioned along the surrounding threads in substantially parallel relationship therewith so that the surrounding threads do not cut the insulated conductor when the cord is flexed during use thereof.

4. An electrical cord, which comprises a stay cord including a plurality of fine textile threads extending therealong parallel with the axis thereof and a plurality of fine textile threads stranded around the first-mentioned threads in the same direction and with the same lay, and a plurality of insulated conductors wrapped around the stranded threads in the same direction as and with substantially the same lay as the stranded threads so that the stranded threads do not cut the insulated conductors during use of the cord.

5. An electrical cord, which comprises a stay cord formed from a plurality of textile threads with at least the outer threads thereof stranded together in a single direction and with a single predetermined lay, and an insulated conductor and a textile cord wrapped in alternate spirals around the threads in the same direction as and with substantially the same lay as the outer threads, said lay of the insulated conductor and the outer threads serving to prevent cutting of the insulated conductor by the outer threads.

6. An electrical cord, which comprises a stay cord formed from a plurality of textile threads with at least the outer threads thereof stranded together in a single predetermined direction and with a single predetermined lay, a plurality of individually insulated conductors, and a plurality of textile cords disposed alternately between two of the conductors, said conductors and said cords lying in the same direction as and with substantially the same lay as the outer threads, the lays of the insulated conductors and the outer threads serving to prevent cutting of the insulated conductors by the outer threads.

7. An electrical cord, which comprises a plurality of fine cotton threads stranded together, each thread extending in the same direction as and having substantially the same lay as the other threads, a conductor enclosed in a covering of insulated material served around the stay cord in the same direction as and with approximately the same lay as that of the threads, a second conductor enclosed in a second covering of insulating material served around the stay cord parallel with the first-mentioned conductor and covering and in the same direction as and with approximately the same lay as that of the threads, said lays of the coverings and the threads serving to prevent cutting of the coverings by the threads, and a jacket of weatherproofing material enclosing said coverings and said stay cord.

GEORGE E. HENNING.

REFERENCES CITED

The following references are of record in the file of this patent:

UNITED STATES PATENTS

| Number | Name | Date |
|---|---|---|
| 2,028,156 | Hodson | Jan. 21, 1936 |
| 2,081,427 | Firth | May 25, 1937 |
| 2,235,523 | Hull | Mar. 18, 1941 |